US006530702B2

(12) United States Patent
Harris

(10) Patent No.: US 6,530,702 B2
(45) Date of Patent: Mar. 11, 2003

(54) OPERATOR SUPPORTED REMOTE CAMERA POSITIONING AND CONTROL SYSTEM

(76) Inventor: Thomas H. S. Harris, 300 Clinton St., Apt. 1, Brooklyn, NY (US) 11201

( * ) Notice: Subject to any disclaimer, the term of this patent is extended or adjusted under 35 U.S.C. 154(b) by 0 days.

(21) Appl. No.: 09/728,104

(22) Filed: Dec. 2, 2000

(65) Prior Publication Data

US 2002/0067922 A1 Jun. 6, 2002

(51) Int. Cl.[7] .......................... G03B 17/00; H04N 7/18; H04N 5/225
(52) U.S. Cl. ..................... 396/420; 396/423; 348/157; 348/376
(58) Field of Search ................. 396/419, 420, 396/421, 422, 423, 425, 428; 348/341, 373, 375, 376, 157, 333.01; 358/906; 386/118

(56) References Cited

U.S. PATENT DOCUMENTS

| | | | |
|---|---|---|---|
| 3,686,434 A | 8/1972 | Lemelson | 360/18 |
| 4,156,212 A | 5/1979 | Covill | 333/100 |
| 4,672,436 A * | 6/1987 | Hawthorne | 348/341 |
| H297 H | 7/1987 | Schultz | 141/232 |
| 4,849,778 A | 7/1989 | Samuelson | 396/428 |
| 4,907,768 A | 3/1990 | Masseron et al. | 248/123.11 |
| 4,943,019 A | 7/1990 | Mester | 248/123.11 |
| 5,054,725 A | 10/1991 | Bucefari et al. | 248/123.11 |
| 5,065,249 A | 11/1991 | Horn et al. | 348/376 |
| 5,180,122 A | 1/1993 | Christian et al. | 244/134 F |
| 5,305,356 A | 4/1994 | Brooks et al. | 376/249 |
| 5,346,111 A * | 9/1994 | Huntley et al. | 224/265 |
| 5,504,788 A | 4/1996 | Brooks et al. | 376/248 |
| 5,531,412 A | 7/1996 | Ho | 248/123 |
| 5,671,932 A | 9/1997 | Chapman | 280/47.11 |
| 5,697,757 A | 12/1997 | Lindsay | 414/744.6 |
| 5,737,377 A | 4/1998 | Stefko et al. | 376/268 |
| 5,900,925 A | 5/1999 | Navarro | 352/53 |
| 5,913,320 A | 6/1999 | Varrin, Jr. et al. | 134/22.18 |
| 6,038,364 A | 3/2000 | Koyama et al. | 386/46 |

* cited by examiner

*Primary Examiner*—David M. Gray
*Assistant Examiner*—Rochelle Blackman
(74) *Attorney, Agent, or Firm*—Akerman Senterfitt

(57) ABSTRACT

A remote camera positioning system provides a camera on a positioner, such as an elongated boom, out of the operator's reach. The positioner provides an operator interface, such as grips and optionally a body harness, to enable the operator to support, control and maneuver the position of the camera. A monitor for displaying images generated by the camera is mounted to the operator to enable the operator to view and control the camera images in a self-contained manner.

49 Claims, 3 Drawing Sheets

OPERATOR SUPPORTED REMOTE CAMERA POSITIONING AND CONTROL SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

FIELD OF THE INVENTION

This invention relates to camera supports. More particularly, the invention relates to supports for remotely positioning cameras.

BACKGROUND OF THE INVENTION

In cinemagraphic and other visual art endeavors, it is often desired to increase the range of viewing perspectives, to obtain various special effects and capture scenes from angles and elevations that are not available from a camera on a tripod or held by a camera man. This is particularly true in the recording of sporting events. Various systems have been developed to address these goals, including elevating and pivoting boom arms, as shown, for example, in Samuelson, U.S. Pat. No. 4,849,778, and steady cam mounts for aircraft, as shown, for example, in U.S. Pat. No. 4,156,512.

While these approaches do increase the range of viewing angles and elevations, they often involve complicated componentry that is typically difficult to be operated by the cameraman alone and is almost certainly too large to be held and maneuvered by cameraman alone. The size of the equipment often limits access to desired viewing and recording areas.

It would therefore be advantageous to provide a remote camera positioning system that is capable of being supported, operated and maneuvered by a sole cameraman.

SUMMARY OF THE INVENTION

It is an object of the invention to provide a camera support that is completely portable by a single operator.

It is another object of the invention to provide an operator supported camera system that can position the camera a substantial distance from the operator while providing positional and pointing control by the operator.

It is yet another object of the invention to provide an operator supported camera system that can be readily maneuvered by the operator while maintaining image quality.

It is still another object of the invention to provide an operator supported camera system that is lightweight to avoid premature operator fatigue.

These and other objects of the invention are achieved by a remote camera positioning system for use and support by a sole operator. The system can include a camera; a camera positioner supporting the camera; and a monitor for viewing images generated by the camera. The monitor has attachments for mounting the monitor on an operator in the operator's field of vision. The camera positioner has an operator interface for supporting said camera positioner and spatially maneuvering the camera through the camera positioner. The camera positioner disposes the camera out of arm's reach at least three feet away from the operator interface. Thus, a sole operator can support, position and maneuver a camera out of arm's reach for obtaining an expanded range of views while monitoring the camera's views in a self-contained manner.

The camera can be a video camera, and the monitor can be a video monitor. The monitor attachments can be adapted to mount the monitor to the operator's torso, such as by straps, belts or the like. Alternatively, the monitor attachments include frames, similar to glasses frames for mounting the monitor in front of the operator's eyes.

The operator interface permits the operator to support the camera positioner and to spatially maneuver the camera through the camera positioner. The operator interface can perform the functions through a combined construction, such as hand grips. Alternatively, the operator interface can include a plurality of components including a hand interface, such as grips, and a body interface, such as support straps for attachment across the operator's chest and back.

According to an aspect of the invention, the camera positioner is an elongated boom, which can be telescoping, and the operator interface includes two separated hand grip surfaces adjacent a proximal end of said boom while the camera is mounted adjacent a distal end of the boom opposite said proximal end. The operator interface is such an embodiment can further include an auxiliary support connected to the boom along its length and being adapted for securement to the operator.

The auxiliary support can, for example, include a strap for mounting around the operator's body, a biased line extending from the strap, a pulley attached to an end of the line opposite the strap; a play line along which the pulley travels; and a frame extending laterally from the boom and providing opposed terminal mounts for the play line, whereby an operator can bear a portion of the system weight while permitting free maneuverability of boom in all directions.

The system can also include various camera head arrangements. For example, the system can include two camera servos for controlling the pan and tilt of the camera relative to the boom. A camera-side servo can provide an output shaft and a camera support arm extending transversely from the output shaft for mounting the camera. A boom-side servo can provide a second output shaft and a servo support arm extending from said second output shaft for mounting the camera-side servo. Preferably, a break-away member having a weakened portion and a planar platform to which the boom-side servo is mounted is provided. The breakaway member is removably attached to the distal end of said elongated boom to break away the camera head in the case of impact or other potentially damaging collision. The system can also include at least one hand operated controller for the camera-side servo and the boom-side servo, said controller being mounted on said boom adjacent one of said hand grip surfaces.

The system can further include a power pack for supplying power to the monitor, the servos and the camera, said power pack having attachments for mounting the power pack to the operator. A video recorder for storing images generated by the camera can also be provided. The video recorder can have recorder attachments for mounting the video recorder to the operator; and image cabling for transmitting signals from the camera to the monitor, said image cabling extending along an interior of the boom; power cabling for coupling the power pack to the monitor, camera and servos; and control cabling for transmitting control signals from the controller to the servos.

Thus, the invention provides a system for enabling a sole operator to independently support, maneuver and monitor a camera remotely positioned beyond arm's reach. In this way, a wider range of views can be obtained in self-contained manner.

BRIEF DESCRIPTION OF THE DRAWINGS

A more thorough understanding of the invention can be gained from a reading of the following detailed description of embodiments of various aspects of the invention, together with a viewing of the accompanying drawings, in which.

DETAILED DESCRIPTION OF EMBODIMENTS OF THE INVENTION

The invention is directed to camera supports. The invention provides a camera support that can be held, maneuvered and controlled by a single operator. The camera support permits remote placement of the camera from the operator at substantial distances, permitting placement and pointing from significant heights as well as wide lateral placements. Additionally, the remote positioning provides a large range of motion of an operator supported camera system.

Figure 1:
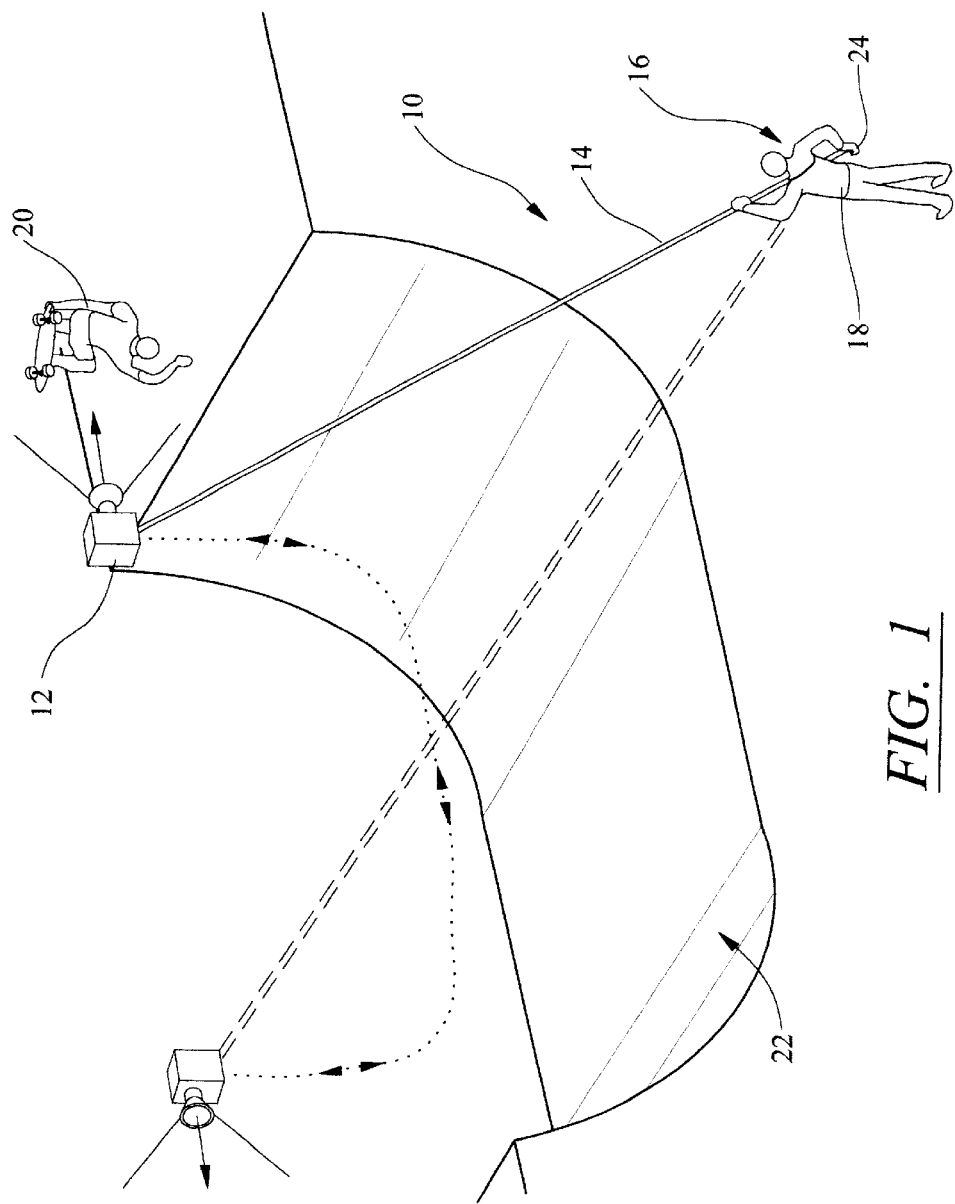
FIG. 1 is a perspective view of a sports environment illustrating an application of a remote camera positioning system according to the invention.

Referring to FIG. 1, an embodiment 10 of the invention can include a camera 12 supported by a camera positioner, such as a boom 14. The camera positioner provides an operator interface, such as the handle region 16 of the boom 14, to enable the operator 18 to support the boom 14 and spatially maneuver the camera 12. With the boom 14, the operator 18 is able, for example, to track up close the travel of a skater 20 in a half-pipe 22. This viewing perspective is made possible by a remote camera positioning system according to the invention and can be managed by a single operator.

As exemplified by the boom 14, a camera positioner according to the invention disposes a camera in a region of out of the operator's arm's reach. This remote positioning is at least three feet from the operator interface, such as the handle region 16 of the boom 14.

As used throughout this specification and the accompanying claims, the three foot distance between the operator interface and the camera position is intended to convey the remote positioning of the camera out of arm's reach; thus, in measuring the three foot spacing, the point of reference in the operator interface region can be the point closest to the operator during use. In the case of the boom 14, the operator interface includes the grip region 24 at the very end of the boom 14 as held by the right hand of the operator 10, and the three foot expanse is measured from this point, rather than the more distal region gripped by the left hand of the operator 18. Of course, the boom 14 can extend well beyond this three foot distance, as shown.

Figure 2:
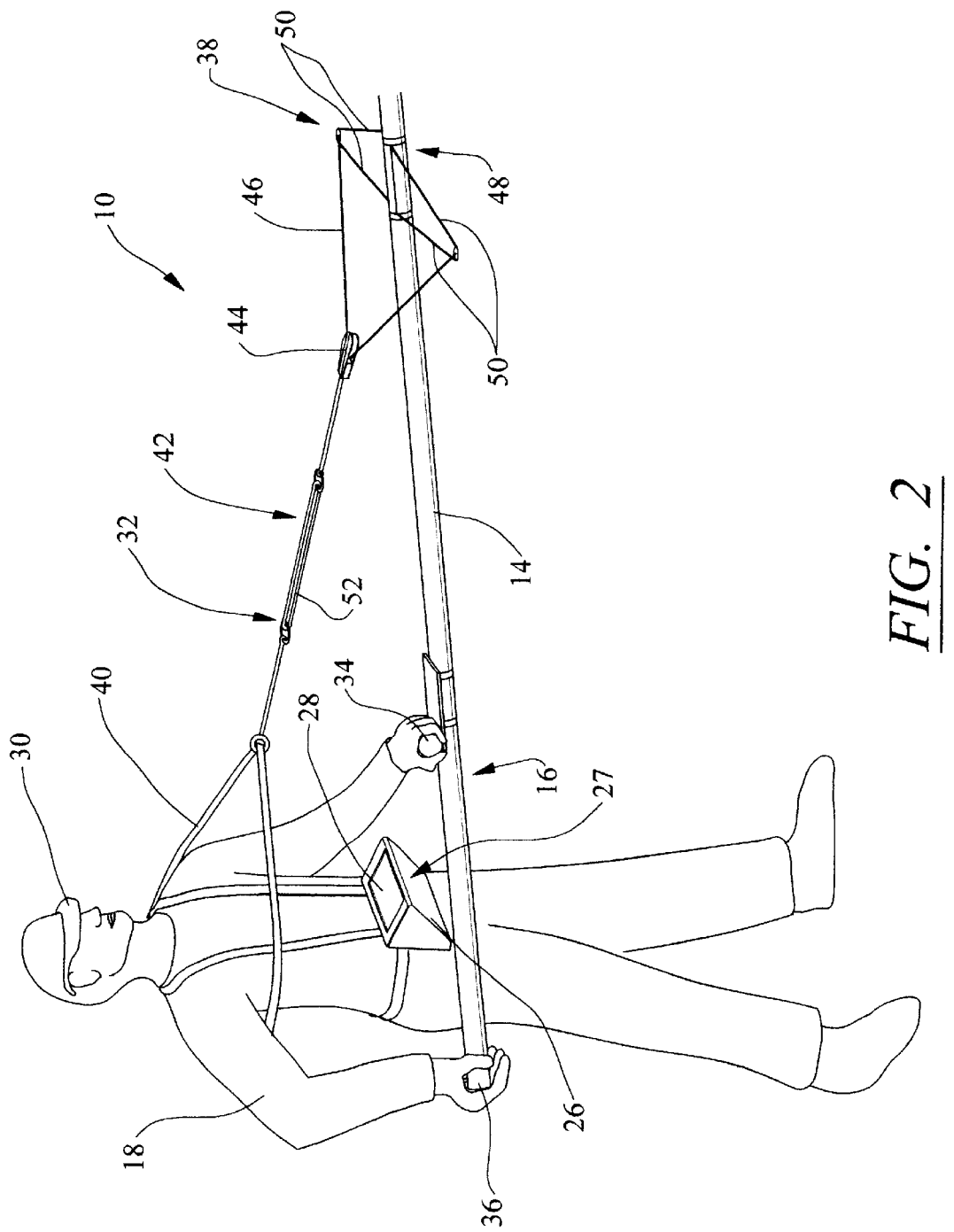
FIG. 2 is a perspective view of an operator utilizing an embodiment of a remote camera positioning system according to the invention, illustrating a body assisted support.

In FIG. 2, the embodiment is partially illustrated from the operator end. The boom 14 is only partially depicted, and in reality, extends to a distal end at which a camera assembly is mounted, an example of which is shown in FIG. 4 and will be discussed later in this specification.

Referring to FIG. 2, a remote camera positioning system also includes a monitor for viewing images generated by the camera (not shown). According to the invention, the monitor is mounted on the operator 18 in the operator's field of vision. Thus, a sole operator 18 can support, position and maneuver a camera (not shown, see FIG. 1) out of arm's reach for obtaining an expanded range of views while monitoring the camera's views in a self-contained manner.

In a preferred embodiment, the monitor is included in an image recorder, such as videocassette recorder 26, for storing images generated by the camera. The monitor can be independent of the recorder 26, and a recorder 26 is optional. In the preferred mode, however, the monitor is a flip-up type monitor 28 mounted to the recorder 26. The preferred recorder is a DVCR, such as the Sony GV-D700, with its own high specific capacity lithium ion rechargeable battery (not shown). The recorder also preferably allows review of any takes already shot.

The monitor can be mounted to the operator is a number of different ways. In one embodiment, the monitor 28 together with its associated recorder 26 is secured by a belly pack positioned at the operator's waist. The belly pack can be, for example, a Radio Shack portable CD player pouch with zipper lid that accommodates the flip out monitor of the DVCR.

The monitor alternatively can include video monitor goggles 30, such as Lightweight Sony PLM-A35 LCD goggles, fed with the system video signal. This arrangement allows "heads up" operation of the camera positioning system 10 without having to stare at the belly pack. This greatly eases framing of the video subject. Use of the goggles 30 in the system also allows for a lighter weight videocassette recorder without a monitor to be used.

As an elongated boom 14 is used as a camera positioner, the operator interface can include hand interfaces 16 on the boom and body interfaces, such as a harness 32. For longer booms, it may be desired to provide additional stabilization and support for the increased bending moment by providing a harness 32 to utilize the operator's body, in addition to the operator's hands, to support the boom 14.

The body interface can be arranged, as in the harness 32, to provide support to the boom 14, while the hand interface 16 is provided to primarily enable the operator to maneuver the boom and thus the camera position. Of course, the hand interface 16 can also simultaneously serve to support the boom 14, with or without the assistance of a body interface, like the harness 32.

The hand interface can include two hand grips 34, 36 spaced along the length of the boom 14. The grip regions can be identified, for example, by padding, foam or the like. Designated and separate grip areas for the operator's hands can be provided with one grip 36 preferably at the end of the boom. Alternatively, a continuous region (not shown) can be provided to allow the operator to vary hand positions along the boom 14. The boom 14 could at a minimum provide no designated areas, in which case the surface of the boom 14 itself can serve as a hand interface.

The operator body interface can be arranged in a variety of manners, so long as it provides the operator 18 with the ability to use his body beyond his hand to support the boom. The operator body interface can include an auxiliary support 38 connected to the boom 14 along its length and adapted to secure to the operator 18. The auxiliary support 38 can include a strap 40 for mounting around the operator's body. A biased line 42 extends from the strap 40 to a pulley 44. A play line 46 travels along the pulley 44, and a frame 48, made of four struts 50 extending laterally from the boom 14, provides opposed terminal mounts for the play line 46. In use, an operator 18 can bear a portion of the system weight while permitting free maneuverability of boom 14 in all directions. Lateral swings of the boom 14 are permitted with the corresponding passage of the play line 46 through the pulley 44.

The biased line 42 can be provided by a spring 52. The spring 52 permits flexible vertical and axial movement of the boom 14 relative to the operator 18.

Alternative support arrangements can be provided, ranging from the hand based support for smaller positioners to body assisted supports for longer or heavier positioning systems. What is important is that the support enables a sole operator to support and maneuver the positioner and the associated camera without assistance.

The boom 14 used in the current embodiment is a lightweight 7-section, 7-meter long fiberglass telescoping windsock pole available at many kite stores. For a 4.0 ounce camera head and an un-stiffened windsock pole, the practical length limit of this boom system is 5 meters. Methods of stiffening are covered later in this specification. The thin walled circular cross-section offers the greatest stiffness per weight by concentrating all of the material as far from the neutral axis of the beam as possible.

One source for telescoping tube sets is a telescoping fiberglass windsock pole available to consumers through Premier Kites of Hyattsville, Md. Of the 4 different lengths of windsock poles available from that vendor, the 22 ft length model 77922 is the best choice because of its larger tubing diameter and therefore greater stiffness. This windsock tube set comes in 7 one meter long sections, with the two thinnest sections at the tip discarded in the current embodiment. All of the tube sections of this telescoping wind sock pole are relatively thin walled with wall thickness at the ends on the order of 0.050 inches. The sections are butted for reinforcing of the friction fit contact areas when extended. The root section of this tube set has a root outside diameter of approximately 1.53 inches. Each section has approximately 0.12 inches less outside diameter than its next larger tube, and tapers approximately 0.080 inches in outside diameter along its length. The tube sets come with a thick layer of paint and primer which protects the relatively thin fiberglass wall and weighs approximately 10% the weight of the total tube set. A 7 section 22 ft. long tube as purchased weighs approximately 2.2 pounds. The cutting to length and painting of these tube sets is not tightly controlled and therefore weights and lengths are subject to significant variation from one tube set to the next.

Excessive bending flexibility of the tubing can negatively affect image quality produced by the camera support system. The weight and stiffness of the tubing are therefore optimized to maximize its stiffness-to-weight ratio. First, the heavy coats of paint and primer are removed. Bundles of extremely high stiffness boron fiber are then added to each tube section at one-quarter points around its circumference. 5.6 mil boron fibers from Textron Systems of Wilmington, Mass. are used, with larger numbers of fibers on the root or proximal tube sections, and successively fewer fibers on farther outboard or distal tube sections. The sections are then coated with a very light (0.5 ounce per square yard) fiberglass cloth and epoxy. After curing, the modified tube sections are individually finished and matched for proper telescoping fit, which is necessary since the outside diameters have been altered by the boron and glass-epoxy processes. The finished weight of each tube section after this process can be kept within plus or minus 1% to 2% of the original weight. The bending stiffness of tube sections, calculated by measuring "ringing" frequencies of a tube tapped while in free fall, may be increased on the order of 15% by the above stated modification process.

The hand held portion of this embodiment, ready for use in a remote camera positioning system, weighs approximately 2.26 pounds (1025 grams) at its full 16.4 foot length (5 meter) with a 4 ounce, 2 channel (pan and tilt) camera head. When the other operator supported components such as the VCR with its own battery, the boom power source and the monitor goggles are added, the total system weight is approximately 6.8 pounds (approximately 3.1 kg). This weight varies with the exact system configuration. Smaller batteries can reduce that weight half a pound or more, and shorter boom lengths also reduce the total system weight by a few to several ounces per meter.

For indoor or confined space uses, shorter camera boom lengths are often necessary. The thin walled circular section telescoping windsock poles are available in shorter lengths, which have smaller diameters. The smaller diameter tubes have less bending and torsional stiffness than the longest version. Such lack of stiffness can contribute to poor image quality both in positioning and pointing error or "wobble". To maximize stiffness, the maximum diameter version of this family of telescoping booms serves as a starting point for the camera boom effort.

The tube section joints are extended to a given extension preload to insure a tight fit. The joint is then jig-drilled in a drill press to produce a repeatable orthogonal set of holes for locking pins. Lightweight carbon fiber locking pins insure that the joints of the telescoping boom will not slip during acrobatic maneuvering or when the boom is held vertically and gravity acts to collapse the boom. The pins are ideally friction fit into the holes, and are also held in place with a rubber band or safety clip.

Once the length or number of segments is determined based on the requirements of the shot, the proximal-most or largest diameter sections of the telescoping tube are used. To maximize stiffness and minimize weight, the unnecessary distal sections of the telescoping tube are removed through the proximal end of the tube to configure the boom length for the shot. The remaining sections are then pinned and the boom head is pinned into the distal tube section.

Figure 3:
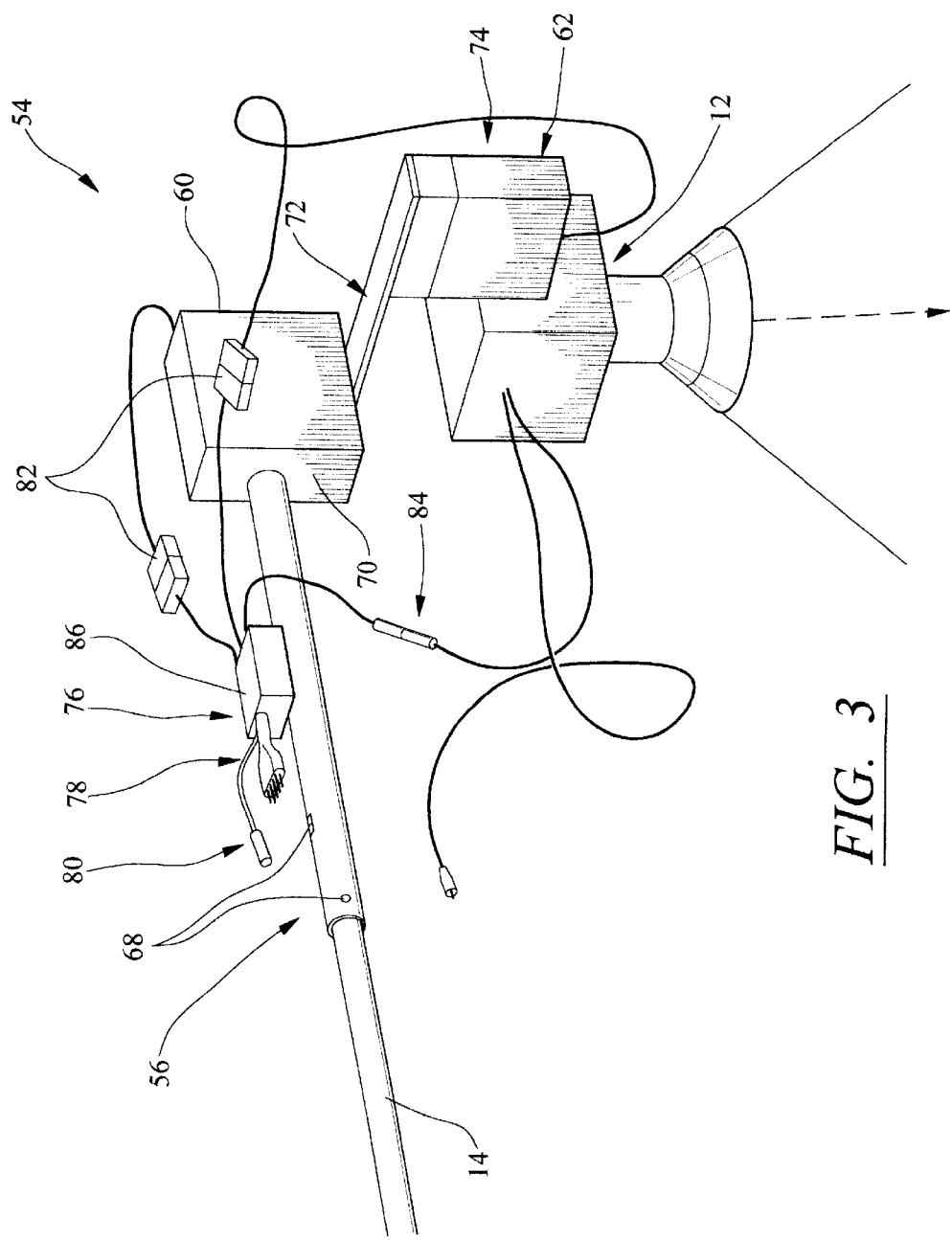
FIG. 3 is a perspective view of a camera head assembly for use in an embodiment of an operator supported camera system according to the invention.

Referring to FIG. 3, the camera 12 is connected to the boom 14 (shown broken away) at the end remote from the operator (not shown). The embodiment includes an assembly collectively referred to as the boom head 54, including a weak link 56, a cable break-out spider 58, two servos 60, 62 for each function of pan and tilt, servo arms 64, 66 and accompanying standoffs/attachment hardware, cable strain relief and the camera 12.

The weak link 56 can be provided to allow the boom head 54 breakaway from the boom 14, in potentially damaging situations, such as camera collisions with external objects. The breakaway can assist in absorbing the impact forces and reduce the possible damage to the camera or servo mechanisms.

The weak link 56 is preferably a narrow tube drilled with the same hole pattern as the telescoping boom segments. The holes 68 are a relatively large fraction of the diameter of the weak link tubing 56, giving the stress concentration necessary to induce failure if any part of the head assembly 54 is contacted with enough force. The weak link tubing 56 can be lightweight thin walled fiberglass arrow shaft stock. The weak link tubing 56 is preferably kept to a relatively low slenderness ratio (short) to minimize bending contributions. At the end of the weak link tubing 56, a lightweight plywood plate 70 the size of the end face of a servo 60 is preferably epoxied for purposes of mounting the servo 60.

A servo 60 can be mounted on this plate 70 using double sided adhesive tape to eliminate shear slippage and two lightweight nylon cable ties (not shown) to maintain a compressive load between the servo 60 and the plywood plate 70.

The two servos 60, 62 are referred to as boom-side servo 60 and camera-side servo 62. Each servo is preferably stripped of unnecessary weight by trimming the mounting flanges from the case and by replacing each servo's stock 3-wire pigtail and connector with lightweight wire and connectors, for a mass reduction of approximately 10–30%. This requires de-soldering and re-soldering directly to the surface-mount-component PC amplifier/controller board found inside the servo upon disassembly, with appropriate grounding and technical protocol.

The servo case itself may also be further cut to reduce mass if it has excess structural strength for the required task. The servo case screws may be cut to partial length for the same effort. Various other material removal approaches can be employed to reduce the weight of the boom head assembly.

The servos 60, 62 used to point the camera 12 are preferably both Hitec 225 metal gear, aluminum output shaft servos to support the loads induced during acrobatic maneuvering. Preferably, the servos 60, 62 are equipped with rigid, fairly strong thick plastic "X" arms. For the boom-side servo 60, the "X" arm can be trimmed of two of the thinner and one of the thicker excess arms and extended in the remaining direction using another piece of thin lightweight plywood 72, attached with very small steel bolts, nuts, and washers using a spec limit high preload torque for maximum compressive load between the arm (not shown) and the plywood arm extension 72. The nuts are then preferably locktight fixed to assure against vibration induced loosening during servo operation and aggressive maneuvering.

The arm and the extension 72 are preferably the width of the servo to be attached to them-the camera-side servo 62. The thickest of the supplied servo arms is used to increase both torsional and beam rigidity of the camera support means. A lightweight (medium to low density depending on the length) balsa standoff 74 can be glued to the end of the plywood arm extension 72, grain parallel to the standoff direction.

The camera-side servo 62 is stuck to the balsa standoff 74 using double-sided adhesive tape to prevent shear slippage and held on compressively using two medium sized zip ties (not shown). The smaller of the plastic "X" arms supplied with these servos is preferably lashed to the camera 12 using small zip ties, allowing the camera 12 to be affixed to the camera-side servo 62.

For the illustrated current embodiment, a lighter weight servo such as the Hitec HS85 metal gear of the Hitec HS 81 metal gear would work in place of the heavier HS-225 for the camera-side servo. With the daisy chained servo configuration, the less weight the servo must support and drive, the lighter the servo that may be used, so a lighter servo may be used on the camera side of the servo chain. For a lighter camera, at ½ or ⅓ ounce, very light servos such in the ½ ounce or even ¼ ounce weight range may be used, for a substantially lighter boom head weight in the 1 to 2 ounce range. Since the servos are sized according to the weight of the camera, camera weight is the major driver in the total weight of the boom head. Since camera head weight is a major driver in required boom stiffness, boom strength and therefore boom weight, the camera itself is the primary driver in the total weight of the hand held portion of the camera boom system.

The camera can be a PC-17 from SuperCircuits. This is a miniature fixed focus, high depth of field, high resolution color CCD camera with a very high resolution of 450 lines and an unmodified weight of 2.5 ounces. These specifications give the camera a relatively high resolution-to-weight ratio of 180 lines-per-ounce. As new cameras continue to be developed in smaller sizes (lighter weights) and higher resolutions, the resolution-to-weight ratio may be used as one guideline for camera selection. If there is a specific resolution required for a specific application, then a camera of greater mass may be necessary. Automatic functions of the camera preferably include gain control, white balance, black balance, shutter (1/60 to 1/100,000 second), color saturation, color hue, and color luminance help keep weight to a minimum since no auxiliary components are necessary for any of these tasks. Connectors and cabling may be modified or omitted to save weight.

The camera preferably comes with a stock "RCA" type video jack and a coax power connector. These two connectors can be replaced with a micro coax connector and a micro power connector, respectively., both of specialty design. Replacing both of these connectors with lightweight versions produces a weight saving of 0.4 ounces for a modified camera weight of 2.1 ounces and a modified resolution-to-weight ratio of 214 lines-per-ounce. The specialty design lightweight coaxial and power connectors are described in detail in the cabling section of this specification.

Another example of a good camera choice for a camera boom is the SuperCircuits PC-53XS, a color camera with a resolution of 380 lines and an unmodified weight of ½ ounce. This camera has an unmodified resolution-to-weight ratio of 760 lines-per-ounce. This camera also comes with relatively heavy connectors compared to the weight of the camera itself. Replacing both of these connectors with lightweight versions produces a modified weight of ⅓ ounce for a modified resolution-to-weight ratio of 1140 lines-per-ounce. This relatively high resolution-to-weight ratio is offset by the practical limits of the lower resolution of this color video camera.

The command and data handling system carries camera pointing commands from a controller (not shown) at the operator end to the servos 60, 62 and camera signals from the camera 14 back to the monitor (not shown, see FIG. 2). Some of the subsystem components may be located along the length of and at the distal end of the positioner, and are therefore can be of an extremely weight critical nature.

With respect to cabling, there are preferably two cables that run the length of the boom 14. The first is a 4-conductor ribbon cable to carry +6 volt and +12 volt power and two servo commands from the operator controller to the camera head. The ribbon cable is stranded copper core to give as much flexibility with as little resistance as possible. For the 20 foot long ribbon cable of the 5 meter boom, 28 AWG# serves this purpose. The second cable is a very thin coaxial cable (RG-178, with an O.D. of only 0.078") to carry the camera signal back to the recorder and whose shield serves as a common ground path for all of the boom head electrical components including both servos, camera power, and video signal. The coaxial cable shield has a 2-inch long pigtail with a single sub-D connector terminal at each end to break out the common ground used by the multiple electrical components of the boom head and the multiple controllers at the proximal end of the boom. The coaxial cable shield serves as the common ground in order to minimize the number of conductors and therefore the overall weight of the full-length boom cable. The ribbon cable carries power for the servos and the camera, and one variable pulse width TTL position command signal for each of the two servos. The coaxial and ribbon cables have connectors at each end for modularity to facilitate trouble shooting, easy reconfiguration, maintenance and upgrades. All power cable connectors have sockets on the power source side to avoid the shorting hazard of power on exposed pins. The ribbon cable has a four-conductor section of integrated circuit socket as a connector at the distal end, strain relieved with preferably clear heat shrink tubing for ease of inspection and damage detection. Said connector is keyed visually to prevent application of incorrect voltage to the camera or the servos. The proximal end of the boom ribbon cable has a similar four-conductor section of integrated circuit pins that is similarly strain relieved and keyed.

The camera boom cable connects to a "break-out spider" at the each end. The distal, or boom head, break-out spider 76 has a four-conductor section 78 from an integrated circuit socket with its pins exposed, and a grounding pigtail 80 with a sub-D pin termination, both of which are strain relieved with preferably clear heat shrink tubing for ease of inspection and damage detection. Again, the four-conductor connector is keyed visually to prevent application of incorrect voltage to the camera or the servos. The distal break-out spider 76 also has 3-conductor "JST" type micro connectors 82 for each servo 60, 62 that deliver a ground path, a +6 volt path, and a command signal path to the servos 62, 62. The "JST" type connectors 82 are lighter than other connectors, such as the Futaba-J type, which is important since every gram saved at the distal end of the boom counts towards image stability. The distal break-out spider 76 also has a micro power connector 84 to supply a ground path and a +12 volt path to the camera 12, and a light weight 3000 micro Farad capacitor 86 between the +6 volt servo power and the common ground to reduce/eliminate servo motor noise from the video ground path.

An operator end breakout spider (not shown) also has a Futaba-J type power plug and a Futaba-J type servo command plug for each of the two camera pointing channels. Lightweight Futaba-J connectors allow the servo drivers or pointing controllers (not shown) to be modular and interchangeable to facilitate trouble shooting, easy reconfiguration (channel swapping), placement of servo signal reverser, maintenance and upgrades. Futaba-J connectors for the pointing controllers also allow the manual servo drivers typical of the radio controlled model hobby type to be used with lightweight connectors supplied. The proximal break-out spider has one Futaba-J type socket connector to receive a Futaba-J type power plug from the operator's power supply.

The proximal end of the coaxial boom cable has a military-specification gold plated SMB coaxial connector for durability and a de-mating force several times the weight of the coaxial cable segment coming from the operator recorder and power source. This allows for physically gymnastic motion of the operator and the boom without the coaxial cable disconnecting under its own weight.

With respect to the recording and monitoring equipment and their support attached to the operator, the operator carries a belly pack with a portable digital videocassette recorder and a power source, preferably a 12-volt battery that also has a 6-volt tap. This belly pack battery is preferably a high specific capacity of 1200 mAHr Nickel Metal Hydride and is fast chargeable (high current capable) for charging convenience. The 12-volt wire from the belly pack battery preferably has an on-off switch in series so that camera power (12 volts) is switch-able. The switch has a relatively high switch force and is contained within the belly pack to prevent inadvertent switching off of the camera. The switch has a connector for charging of the 12-volt belly pack battery. The connector on the belly pack battery pigtail has the 12 volts lead in the signal position of the Futaba-J connector (same end as the key flange) to allow for charging with any model hobby "smart charger" or peak detection charger. The 6-volt power is always live, so when power is applied to the boom the servo controllers and the servos become active. The camera may then be switched on once pointing aliveness and functionality have been confirmed.

To drive the servos and their controllers, a 6 volt battery can be used. Alternatively, a 4.8 volt battery can be provided. As individual components, the servos and the controllers work fine on either. The servos are faster and higher torque at the higher voltage, and they also make the camera pointing jerky due to the limited number of digital steps in the decoded position (interpreted by the amp/controller board within the servo). This makes narrow angle lenses impractical. Too far below 4.8 volts, the logic circuitry in either the servo or the controller starts to die, as does the quality of the variable pulse-width command signal from the hand controllers by the time it travels down 20+ feet of unshielded narrow gauge ribbon cable. The solution to this problem would be to power the hand controllers in the 6-volt range, and the servos at some reduced voltage to produce slightly slower, smoother camera pointing motion.

The coaxial cable from the recorder to the boom has a standard right angle video plug at the proximal end to fit into the jack on the side of the DVCR without protruding from the belly pack easily. It is slightly heavier then the boom segment of coax, with approximately 0.1" O.D. to survive wear and tear associated with being exposed.

The coaxial connector between the camera and the boom cable can be hand built from a high current connector pair, a sub-D connector termination pair, and heat shrink tubing. Radio Shack part numbers (274–151) and (274–154) are the male and female sides of the coaxial shield or outer jacket, respectively. The back end of these crimp type connectors, designed to crimp the insulation of the wire, is removed to reduce weight. The mid portion of these connectors, designed to crimp the conductor, is trimmed to crimp the size of the coaxial cable shield to be used. The hemispherical end of the male side connector can be removed to leave an open-ended cylinder, and the trimmed edge is de-burred and smoothed.

The sub-D pin and socket crimp connectors are also trimmed to remove weight by cutting off the crimp flanges designed to hold the insulation of the wire for strain relief. The mid-section of the sub-D connector terminations are crimped onto the center of the coaxial cable. The pin of the male sub-D is cut to approximately ⅓ to ½ of its original length to make it shorter than the shield cylinder in which it sits inside. This insures that electrical continuity of the shield (the ground path) is established before electrical contact of the positive voltage signal upon mating. Heat shrink tubing of appropriately small diameter is used as strain relief to hold the sub-D connector to the dielectric of the coaxial cable and also to insulate the cable end of the sub-D from the shield braid of the coaxial cable. This piece of heat shrink tubing should be placed onto the coaxial dielectric after pulling back the shield braid 3 to 5 mm depending on the diameter of the cable (less for the 0.070 O.D. RG-178 and more for the thicker belly pack cable) and before crimping the sub-D connector onto the center conductor of the coaxial cable.

The micro coaxial connectors are arranged with both sockets on one side of the connector and both pins on the other side. The coaxial cables to be connected are often of different diameters, since it is the short camera coaxial pigtail that is to be mated with the very thin boom coaxial cable. No matter what the diameters of the two cables, strain relief, centering, relative positioning of inner and outer contacts, and of course electrical properties (continuity across the crimps and insulation between signal and shield) are the primary goals of the micro coaxial connector build-up process.

The entire length of the female sub-D is covered in heat shrink tubing back to the region where the shield female will be crimped onto the shield braid. This tubing serves to insulate the sub-D female from the shield male connector during the mating and while mated. Then a piece of larger diameter heat shrink tubing is applied to the female sub-D connector starting where the shield male connector reaches in the mated state and ending where the female shield connector is crimped to the shield braid. This piece of heat shrink tubing shrinks to slightly larger than the inside diameter of the shield female termination, and serves to hold the inner female centered within the shield female. Continuing with the build-up of the female-female (FF) side connector, the shield female is then crimped onto the coaxial shield braid at the position along the cable such that the ends of the two female contacts are at the same station along the cable axis after a (preferred clear for inspection and damage detection) final outer heat shrink tubing section has been positioned onto the cable. Once crimped, the female shield termination is then covered and secured using the heat shrink tubing. The tubing serves as further strain relief for the female shield and keeps the otherwise exposed edges of the locking flanges of that crimp connector from scratching or damaging any fault intolerant or notch sensitive components of the camera boom system.

The male-male (MM) side of the micro coaxial connector is then completed in the same fashion as the FF side. The exception is that the end of the center pin should be approximately 2 or 3 mm short of the end of the male shield for reasons previously stated. The layered heat shrink tubing is used in the same fashion as in the FF side to accomplish strain relief, electrical insulation between the center conductor path and the outer shield, and to hold the inner pin centered within it's respective shield. The MM side micro coaxial connector is also covered with clear heat shrink tubing for reasons previously stated.

In the current embodiment, the servo controllers are modified Manuel Servo Drivers from Custom Electronics of Corpus Christi, Tex. They are modified to provide faster signal refresh rates than the stock 20 msec controllers. The refresh rate is also different for each controller used on the boom so that they don't interfere with each other through antenna effects over the long straight run of unshielded ribbon cable which carries their signals from the proximal spider to the boom head. The potentiometers are sealed to keep out contamination. The controllers are preferably removed from their relatively heavy boxes and heat shrink covered to seal them against shorting through contact with outside objects. They can be strapped to lightweight aircraft plywood plates using medium sized lightweight nylon zip-tie fasteners and the potentiometers and centering buttons are also mounted on the same plywood plates. Over-sized knobs are preferably used on the potentiometers to facilitate a greater degree of fine control input by the operator.

Each plywood plate an be screwed to a pair of lightweight model airplane muffler mounting brackets from Dave Brown products using lightweight #10 nylon nuts and bolts. The brackets can in turn be secured to the proximal segment of the boom tube using a single medium sized lightweight nylon zip-tie fastener for each bracket. Small strips of thin foam tape with single sided adhesive on the bracket side of the tape are then placed between the boom tubing and the brackets to avoid surface abrasion and otherwise eliminate sharp edge contact to the boom tubing which may induce stress concentrations and undue fatigue damage on the boom tubing.

The power and servo command signal cable pigtails of the controllers are preferably 24 inches long, instead of the usual 8 inch cables, to facilitate reaching to the midpoint of the proximal boom segment where they mate with the proximal break-out spider. The controller pigtails typically come with standard Futaba-J type connectors, which are lightweight and allow for ease of trouble shooting, reconfiguration (channel swapping), maintenance and upgrades.

While preferred components and arrangements for implementing the features of the invention have been disclosed with a relatively high degree of particularity, it should be understood that these details are only intended as examples. The scope of the invention should therefore be determined from a reading of the following claims.

I claim:

1. A remote camera positioning system for use and support by a sole operator, comprising:
    a camera;
    a camera positioner supporting said camera, said camera positioner having an operator interface to enable an operator to support said camera positioner and spatially maneuver said camera through said camera positioner, said camera positioner disposing said camera at least three feet away from said operator interface;
    a monitor for viewing images generated by the camera, said monitor having monitor attachments for mounting the monitor on an operator interfacing with said operator interface, in the operator's field of vision, whereby a sole operator can support, position and maneuver a camera out of arm's reach for obtaining an expanded range of views and monitor the camera's views in a self-contained manner; and
    a recorder for storing images generated by the camera, said recorder having recorder attachments for mounting the recorder to the operator, said recorder being operatively connected to the camera to receive images signals from the camera.

2. The system according to claim 1, wherein the camera is a video camera.

3. The system according to claim 2, wherein the monitor is a video monitor.

4. The system according to claim 1, wherein the monitor attachments are adapted to mount the monitor to the operator's torso, and the recorder attachments are adapted to mount the recorder to the operator's torso.

5. The system according to claim 1, wherein the monitor attachments include frames for mounting the monitor in front of the operator's eyes.

6. The system according to claim 1, wherein said operator interface includes at least one of a hand interface and a body interface.

7. The system according to claim 6, wherein said hand interface is adapted to spatially maneuver the camera and said body interface is adapted to an operator support interface for the camera positioner.

8. The system according to claim 6, wherein the hand interface is adapted to spatially maneuver the camera and at least partially provide an operator support interface for the camera positioner.

9. The system according to claim 1, wherein the positioner is an elongated boom, said operator interface includes two separated hand grip surfaces adjacent a proximal end of said boom, said camera being mounted adjacent a distal end of the boom opposite said proximal end.

10. The system according to claim 9, wherein said operator interface includes an auxiliary support connected to the boom along its length and being adapted for securement to the operator, said auxiliary support including a biasing member between the operator and the boom.

11. The system according to claim 10, wherein said auxiliary support includes a strap for mounting around the operator's body, a biased line extending from the strap, a pulley attached to an end of the line opposite the strap; a play line along which the pulley travels; and a frame extending laterally from the boom and providing opposed terminal mounts for the play line, whereby an operator can bear a portion of the system weight while permitting free maneuverability of boom in all directions.

12. The system according to claim 9, wherein the boom is telescopingly adjustable.

13. The system according to claim 9, further comprising a camera-side servo having an output shaft and a camera support arm extending transversely from the output shaft, said camera being mounted to said camera support arm; a boom-side servo having a second output shaft and a servo support arm extending from said second output shaft, said camera-side servo being mounted to said servo-support shaft.

14. The system according to claim 13, further comprising a power pack for supplying power to the monitor, the servos and the camera, said power pack having connectors for mounting the power pack to the operator.

15. The system according to claim 13, further comprising image cabling for transmitting signals from the camera to the monitor, said image cabling extending along an interior of the boom; power cabling for coupling the power pack to the monitor, camera and servos; and control cabling for transmitting control signals from the controller to the servos.

16. The system according to claim 13, further comprising a break-away member having a weakened portion and a planar platform to which the boom-side servo is mounted, said breakaway member being removably attached to the distal end of said elongated boom; and at least one hand operated controller for said camera-side servo and said boom-side servo, said controller being mounted on said boom adjacent one of said hand grip surfaces.

17. The system according to claim 1, wherein the camera is connected to a distal end of the camera positioner and the camera positioner extends to a proximal end opposite said distal end, and the stiffness per unit length of the camera positioner decreases from the proximal end to the distal end.

18. The system according to claim 1, wherein the camera is connected to a distal end of the camera positioner and the camera positioner extends to a proximal end opposite said distal end, the mass per unit length of the camera positioner decreases from the proximal end to the distal end and the combined center of gravity of the camera positioner and camera is distal the operator interface.

19. The system according to claim 1, wherein the camera is connected to a distal end of the camera positioner and the camera positioner extends to a proximal end opposite said distal end, and the stiffness per unit length of the camera positioner and the mass per unit length of the camera positioner both decrease from the proximal end to the distal end.

20. The system according to claim 1, wherein the camera is connected to a distal end of the camera positioner and the camera positioner extends to a proximal end opposite said distal end, and the stiffness to mass ratio per unit length decreases from the proximal end to the distal end.

21. An operator supported camera positioning and control system, comprising:

a camera positioner, said camera positioning including a elongated boom having an operator interface at a proximal end and supporting a camera assembly at an opposite, distal end, said operator interface including two hand grip surfaces spaced apart along the length of the boom;

said camera assembly including a camera; a camera-side servo having an output shaft and a camera support arm extending transversely from the output shaft, said camera being mounted to said camera support arm; a boom-side servo having a second output shaft and a servo support arm extending from said second output shaft, said camera-side servo being mounted to said servo-support shaft; and a break-away member having a shaft with a weakened portion and a planar platform to which the boom-side servo is mounted, said break-away member being removably attached to the distal end of said elongated boom;

at least one hand operated controller for said camera-side servo and said boom-side servo, said controller being mounted on said boom adjacent one of said hand grip surfaces;

a monitor for viewing images generated by the camera, said monitor having line of sight connectors for mounting the monitor on the operator in the operator's field of view;

a power pack for supplying power to the monitor, the servos and the camera, said power pack having connectors for mounting the power pack to the operator;

a video recorder for storing images generated by the camera, said video recorder having recorder connectors for mounting the video recorder to the operator; and image cabling for transmitting signals from the camera to the monitor, said image cabling extending along an interior of the boom; power cabling for coupling the power pack to the monitor, camera and servos; and control cabling for transmitting control signals from the controller to the servos.

22. A remote camera positioning system for use and support by a sole operator, comprising:

a camera;

a camera positioner supporting said camera, said camera positioner having an operator interface to enable an operator to support said camera positioner and spatially maneuver said camera through said camera positioner, said camera positioner disposing said camera at least three feet away from said operator interface; and a monitor for viewing images generated by the camera, said monitor having monitor attachments for mounting the monitor on an operator interfacing with said operator interface, in the operator's field of vision, whereby a sole operator can support, position and maneuver a camera out of arm's reach for obtaining an expanded range of views and monitor the camera's views in a self-contained manner;

said camera connecting to said camera positioner at a distal end of said camera positioner, said camera positioner extending to a proximal end opposite said distal end;

wherein the stiffness per unit length of said camera positioner decreases from the proximal end to the distal end.

23. The system according to claim 22, the mass per unit length of the camera positioner decreases from the proximal end to the distal end.

24. The system according to claim 22, the stiffness to mass ratio per unit length of the camera positioner decreases from the proximal end to the distal end.

25. The system according to claim 22, wherein the camera positioner is a boom.

26. The system according to claim 25, wherein the operator interface includes two hand grip surfaces spaced apart on the camera positioner and both located adjacent the proximal end of the camera positioner, said hand grip surfaces being closer to said proximal end than said distal end.

27. The system according to claim 26, wherein one of said two hand grip surfaces is positioned at the proximal end of the camera positioner.

28. The system according to claim 25, further comprising a camera-side servo having an output shaft and a camera support arm extending transversely from the output shaft, said camera being mounted to said camera support arm; a boom-side servo having a second output shaft and a servo support arm extending from said second output shaft, said camera-side servo being mounted to said servo-support shaft.

29. The system according to claim 25, wherein said operator interface includes an auxiliary support connected to the boom along its length and being adapted for securement to the operator, said auxiliary support including a biasing member between the operator and the boom.

30. The system according to claim 22, wherein the camera positioner includes thin wall tubing, wherein the wall thickness is equal to or less than approximately 1/17 (one-seventeenth) of the diameter of the tube.

31. The system according to claim 22, wherein the camera positioner is elongated with a slenderness ratio of at least approximately 50-to-1 length-to-diameter.

32. The system according to claim 22, wherein the camera positioner decreases in cross-sectional area from its proximal end to its distal end.

33. The system according to claim 32, wherein the camera positioner tapers from its proximal end to its distal end.

34. The system according to claim 22, wherein the camera positioner has a length of at least five meters, and a distal end diameter of less than an inch which is less than cross sectional diameter at the proximal end.

35. The system according to claim 22, where the camera positioner has a length of at least 5 meters and a proximal end diameter of at least 1.5 inches which is greater than a cross sectional diameter at the distal end.

36. The system according to claim 22, where the camera positioner is constructed at least partially of composite material.

37. The system according to claim 36, wherein the composite material reinforced with fibers.

38. The system according to claim 37, wherein the reinforcing fibers include fiberglass.

39. The system according to claim 37, wherein the reinforcing fibers include boron.

40. The system according to claim 37, wherein there is a greater concentration of fibers towards the proximal end of the camera positioner relative to a concentration of fibers toward the distal end of the camera positioner.

41. The system according to claim 37, where the camera positioner includes a lamination of fiberglass cloth and epoxy.

42. The system according to claim 41, wherein the fiberglass cloth weighs approximately 0.5 ounces per square yard.

43. The system according to claim 22, wherein the camera positioner and camera have a combined weight of less than or equal to 2.26 pounds.

44. The system according to claim 22, where the camera and the camera positioner collectively have a ratio of mass to length of less than or equal to 0.1378 pounds per foot.

45. The system according to claim 22, further comprising camera support structure for connecting the camera to the positioner at said distal end, said camera and said support structure having a combined weight of less than or equal to 4 oz.

46. The system according to claim 45, where the camera and the camera support structure have a combined mass of less than or equal to approximately one-ninth (1/9) of the combined mass of the camera, camera support structure and camera positioner.

47. The system according to claim 45, where the camera and camera support structure have a combined mass per length of the camera positioner of less than or equal to 22.7 grams per meter.

48. The system according to claim 22, where the camera has a resolution as measured in horizontal lines per mass ratio of equal to or greater than 7.56 horizontal lines/gram.

49. The system according to claim 22, where the camera has a resolution, as measured in horizontal lines, of greater than or equal to 450 horizontal lines.

* * * * *